United States Patent
Neubert

(10) Patent No.: US 7,376,616 B2
(45) Date of Patent: May 20, 2008

(54) METHOD OF MAXIMIZING ACCOUNTS PAYABLE DISCOUNTS

(76) Inventor: Robert Alan Neubert, 1991 Linden La., Hatfield, PA (US) 19440

( * ) Notice: Subject to any disclaimer, the term of this patent is extended or adjusted under 35 U.S.C. 154(b) by 1416 days.

(21) Appl. No.: 09/931,444

(22) Filed: Aug. 16, 2001

(65) Prior Publication Data
US 2002/0026407 A1 Feb. 28, 2002

Related U.S. Application Data

(60) Provisional application No. 60/225,814, filed on Aug. 16, 2000.

(51) Int. Cl.
G06Q 40/00 (2006.01)
(52) U.S. Cl. .......................... 705/37; 705/35
(58) Field of Classification Search ............ 705/35, 705/36 R
See application file for complete search history.

(56) References Cited

U.S. PATENT DOCUMENTS

| | | | |
|---|---|---|---|
| 5,383,113 A | 1/1995 | Kight et al. ............... 364/401 |
| 5,732,400 A | 3/1998 | Mandler et al. ........... 705/26 |
| 6,006,199 A | 12/1999 | Berlin et al. ............... 705/26 |
| 6,052,674 A | 4/2000 | Zervides et al. ........... 705/40 |
| 6,073,104 A | 6/2000 | Field ........................ 705/1 |
| 6,415,270 B1* | 7/2002 | Rackson et al. ........ 705/36 R |
| 6,687,708 B1* | 2/2004 | Brobst et al. ........... 707/103 Y |
| 2001/0051919 A1* | 12/2001 | Mason ...................... 705/40 |

OTHER PUBLICATIONS

Michaelas et al., Pay and Save, Jun. 1999, vol. 123, Iss. 1270; p. 92.*

* cited by examiner

Primary Examiner—Hani M. Kazimi
Assistant Examiner—Olabode Akintola
(74) Attorney, Agent, or Firm—Barley Snyder LLC

(57) ABSTRACT

A method and system for identifying discount opportunities relating to invoices on goods or services purchased by a buyer from a seller is described. Additionally, the invention is directed to a system for allowing third parties to bid on and utilize such discounts at a specified rate of return. The system allows the transaction between the buyer and supplier to be conducted in the normal course of business.

14 Claims, 6 Drawing Sheets

METHOD OF MAXIMIZING ACCOUNTS PAYABLE DISCOUNTS

"This application claims the benefit of U.S. Provisional Application(s) No. 60/225,814, filed Aug. 16, 2000."

FIELD OF THE INVENTION

The invention is directed to a method of monitoring databases to maximize profits. In particular, a method of utilizing discounts offered on accounts payable to maximize profits is disclosed.

BACKGROUND OF THE INVENTION

In today's global economy, it is common for a seller to provide goods or services without receiving prior payment for such goods or services. Under these circumstances, it is typical for the seller to invoice the buyer for the price of the goods or services. The invoices can be provided with the goods or services or may be sent at a later date. While invoices can be used for individuals, it is a more common practice for corporations to use such an invoice system.

The payment terms for the invoices can be negotiated between the parties or the seller establishes the payment terms. Typically, seller will give buyer 30 days from the invoice date to make payment. However, while 30 days may be customary, the seller would prefer to receive payment as soon as possible. Therefore, in order to encourage the buyer to make prompt payment, the seller will often offer the buyer a discount if the buyer pays prior to the established final payment date.

A typical discount used is referred to as "2, 10 net 30." This is short hand to indicate that the full amount is due to the seller in 30 days. However, if buyer pays within 10 days, the amount due is discounted by 2%. By so doing, the seller avoids cash flow problems and the buyer receives the goods or services at a discount rate.

While discounts are routinely offered by sellers, many buyers do not take advantage of these discounts. Buyers often have cash flow problems which limits their ability to take advantage of the discounts. The buyers simply do not have the cash and, therefore, no matter how attractive the discount may be, the buyers cannot participate. Alternatively, buyers may feel that they can get a better rate of return on their money and choose not to take the discount offer. By deferring payment as long as possible, the buyer believes that they can use or invest the money and receive a higher rate of return than the discount offered by the seller. In fact, many corporations are not paying the invoices within 30 days, but rather deferring payment for as much as 90 days. Another reason that buyers do not take advantage of the discounts relates to the internal bureaucracy within the buyer's organization. In large organizations, invoices must be approved by the appropriate group and sent to the accounting department. Often the accounting department will not receive the invoices until after any discounts period has expired. It is also not uncommon for the accounting department to not be aware of any discount terms which were previously negotiated.

Therefore, it would be beneficial to provide a system or method for buyers to identify any discount opportunities available. Also, if the buyer elects to not take advantage of the discount, it would be advantageous to provide a system or method to allow third parties to take advantage of the discount terms.

SUMMARY OF THE INVENTION

A method and system for identifying discount opportunities relating to invoices for goods or services purchased by a buyer from a supplier is described. The system allows third parties to bid on and utilize such discounts at an agreed upon rate of return. Although third parties can participate in the utilization of the discounts, the transaction between the buyer and supplier is conducted in the normal course of business, and the bidding process is transparent to both the buyer and the supplier.

The invention is directed to a system for exploiting discount opportunities relating to invoices billed from a supplier to a buyer. The invoices have invoice terms which state a discount price if the invoice is paid within a discount period and a full price of the invoice is not paid within the discount period. The invoices which have discount prices associated with payment of the invoice during the discount period are identified. Information relating to the invoices on which discounts are available is provided to prospective bidders. Bids are received from respective potential bidders which indicate the bidders terms upon which the respective potential bidders will pay the invoices during the discount period. A winning bidder is selected from the respective potential bidders based upon select criteria. If no respective potential bidders meet the select criteria, no winning bidder will be selected. This system can be performed by the buyer or an independent third party, such as a discount agent.

The invention is also directed to a method of exploiting discount opportunities as recited above wherein relevant data from all invoices received by a buyer in entered into a computer data base. The computer data base is searched to determine which invoices have the discount price if the invoice is paid within the discount period. A report is generated which lists all invoices which have the discount price. The report is utilized to pay the discount price to the supplier during the discount period.

The invention is further directed to a method of exploiting discount opportunities in which invoices which have discount terms are numerically coded according to appropriate criteria. Potential bidders also have a numerical code assigned to them to indicate their preferences on the type of invoices on which the respective potential bidder will bid. The numerical coding of the potential bidders and the numerical coding of the invoice is matched and information relating to the invoices which match the numerical coding of respective prospective bidders is provided to such respective prospective bidders. Bids are received from respective potential bidders which indicate the bidders terms upon which the respective potential bidders will pay the invoices during the discount period. A winning bidder is selected from the respective potential bidders based upon select criteria. If no respective potential bidders meet the select criteria, no winning bidder will be selected.

BRIEF DESCRIPTION OF THE DRAWINGS

FIG. 1 is a flow chart illustrating a system for identifying discounts and having such discounts paid by a third party.

DETAILED DESCRIPTION OF THE INVENTION

In commerce, goods or services are routinely purchased from suppliers. In many instances, the supplier will invoice the buyer for payment of such goods or services. The terms and conditions for payment are generally established by the seller and are included on the invoice. One such discount is referred to as 2, 10 net 30. This means that the buyer must pay the full amount to the seller within thirty (30) days from the invoice date. However, in order to encourage the buyer to pay more quickly, the seller will accept the full amount less a two percent (2%) discount if the payment is made within ten (10) days of the invoice date. This is just one illustration of the type of discount offered.

Figure 2:
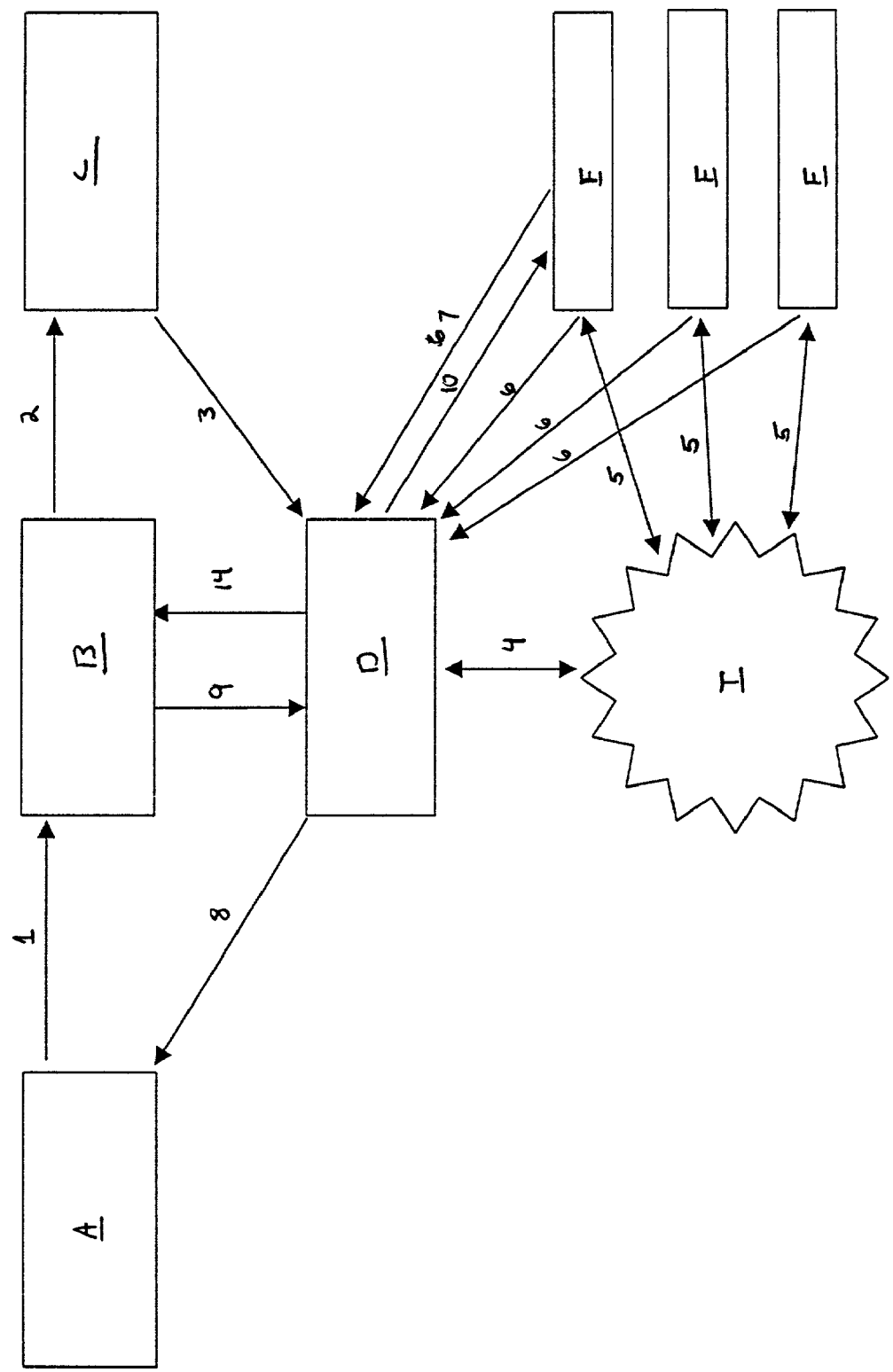
FIG. 2 is a flow chart illustrating the system for identifying discounts, with no party taking advantage of such discounts.
Figure 2:
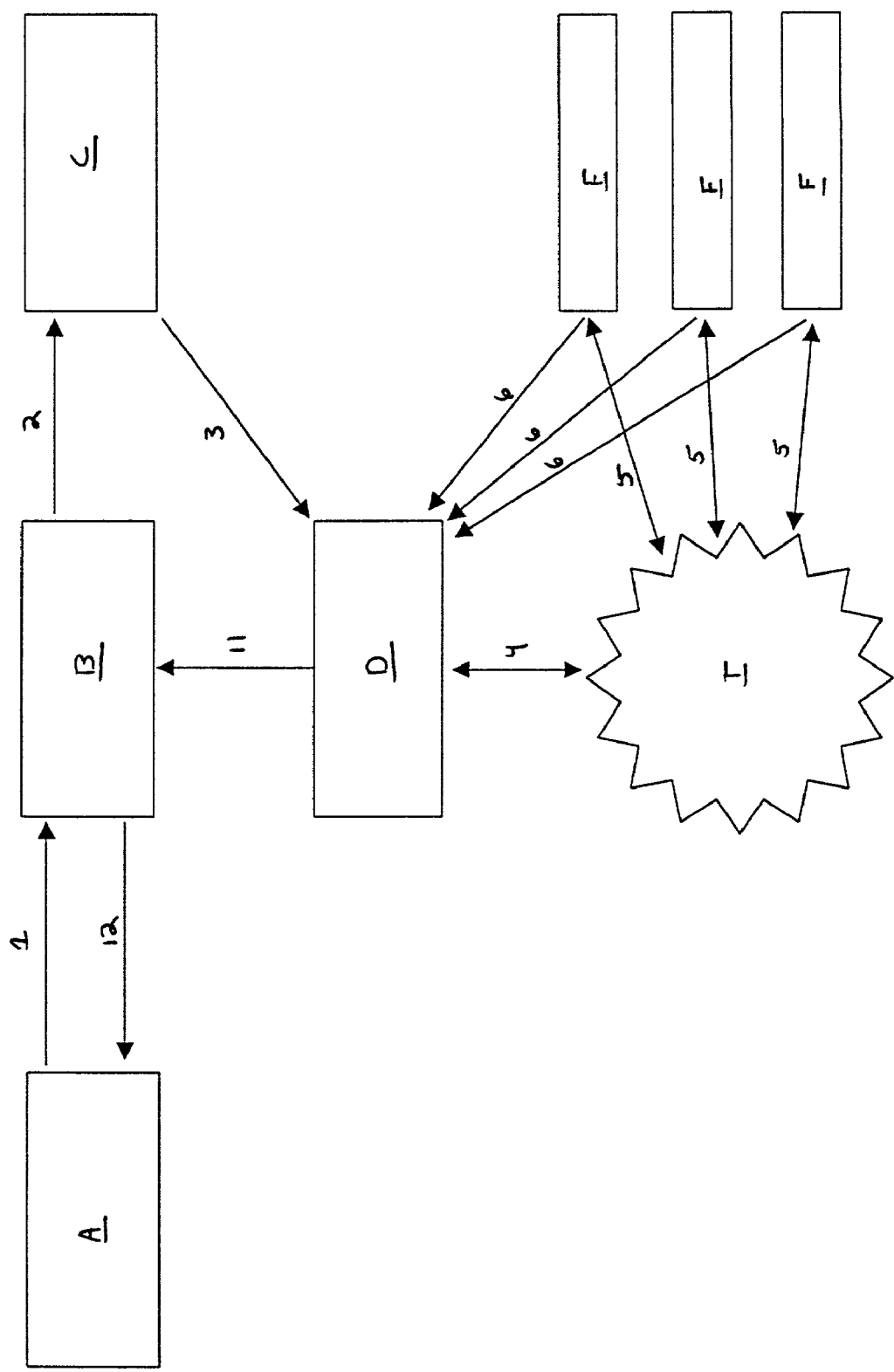
Figure 3:
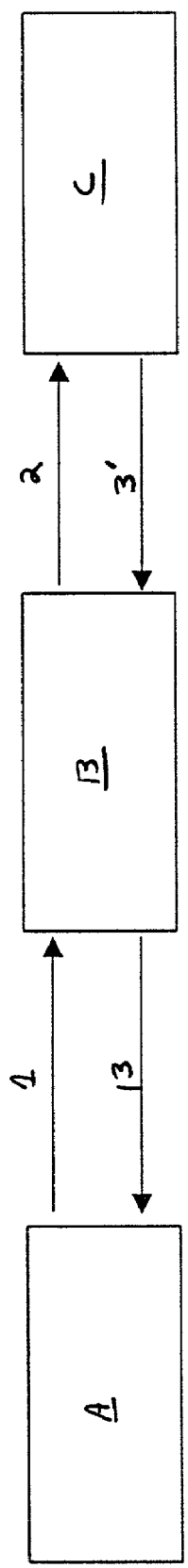
FIG. 3 is a flow chart illustrating the system for identifying discounts, with the buyer taking advantage of such discounts.

Referring to FIG. 1 through 3, the seller or supplier, represented by box A, invoices the buyer, box B, for the goods or services purchased. While FIGS. 1 through 3 illustrate different scenarios for transactions, the same numbers will be used to describe identical items. The invoice is generated by the supplier A and sent to the buyer B as illustrated by the arrow 1. The invoice recites the payment terms, including any applicable discount terms. Upon receipt by the buyer, all relevant payment terms are entered into a database. The database is searched and manipulated, as represented by arrow 2, by a screening software, box C. The screening software C searches relevant fields in the database to determine which invoices have discount terms associated therewith. A list of all relevant invoices is generated. If the buyer choses not to pay the supplier during the discount period, the list and the relevant invoices are sent or assigned, as represented by arrow 3 (FIGS. 1 and 2), to a discount agent, box D. This assignment occurs prior to the expiration of the discount period. The assigned invoices are entered into the discount agent's database. It is important to note that the screening software C and the database used by the discount agent D may be located at the discount agent's facilities. This is particularly appropriate if the buyer never takes advantage of the discounts. In addition, the buyer may routinely send invoices to the discount agent to have the discount agent enter the information in the database. In the alternative, the buyer B may use the screening software C to identify potential discounts which the buyer can pay without the use of a discount agent. This scenario is represented by FIG. 3. In such case, the list is generated by the screening software C and provided to the buyer B as represented by 3' in FIG. 3. The buyer B then pays supplier A during the discount period, as represented by 13.

It is important to realize that many buyers do not take advantage of the discounts for various reasons, including i) buyer cash flow problems, ii) the buyer feels they can get a better rate of return on their money or iii) corporate bureaucracy can make it difficult to process and pay bills within the appropriate time frame.

Referring again to FIGS. 1 and 2, periodically, the assigned invoices and the terms thereof are auctioned over the Internet. Each invoice may be auctioned immediately upon receipt in the discount agent's database or may be retained for a limited time and auctioned with other invoices. It is important that no particular invoice be maintained in the discount agent's database for a long period of time, as the discounts are time sensitive.

Prior to placing invoices up for bid, the discount agent has compiled a list of bidders. This list has been researched and each bidder has gone through an approval process. During the approval process, each bidder or potential bidder is pre-qualified to insure that each bidder has the financial resources to participate. The pre-qualification process may also utilize other criteria to determine serious bidders. In addition, each potential bidder has indicated their preference for the types of invoices they wish to bid on and have been coded accordingly. The preferences can deal with credit worthiness of the buyer, dollar amount of invoice, etc. All approved bidders are assigned a numerical code indicating their preferences. Each invoice is also numerically coded according to appropriate criteria. The coding results in each bidder and each invoice having a smart number assigned thereto. This smart numbering system is better described in U.S. Pat. application Ser. No. 09/450903 which is hereby incorporated by reference.

Once an invoice is entered into the discount agent's database, the database matches the invoice code with the code of appropriate pre-qualified or pre-approved bidders. The invoice is then put out for bid via the Internet to only those appropriate bidders. The entire bidding process must be accomplished quickly, as the discounts are time sensitive and must, therefore, be accomplished with the use of the Internet. If the numerical code of the invoice does not match respective digits of the numerical code of the potential bidders, the invoice will not be auctioned over the Internet, and the invoices will not be paid during the discount period.

After the invoices are coded, the appropriate information is sent to the appropriate bidders F. In order to accomplish this, the discount agent D submits, as represented by 4, through a server over the Internet I and through the client server 5, information to the respective approved bidders F relative to the auction. The bidders F examine the information provided on the invoices and determine if they want to bid. The bidders will exam the length of time between when the discount term expires and when the full term of the invoices expires, the discount rate, the amount of the invoice, and other factors to determine if they wish to bid on the particular invoice. The bids are communicated to the discount agent by means of the Internet, as represented by 5, I, 4, or other know means of communication directly with the discount agent D, as represented by 6. The bidding process will be more fully described below with the use of an example.

As shown in FIG. 1, upon determination of the successful bidder, the discount agent D will collect the funds needed to pay the supplier, at the discount rate, from the winning bidder, as represented by 7. The discount payment will be made from the discount agent D to the supplier A, as represented by 8. Generally, the payment from the discount agent D to the supplier will occur on the last day of the discount term to allow the discount agent to maintain the money as long as possible, thereby maximizing the return realized.

Prior to the expiration of the full term, the buyer B will pay the discount agent D the full amount of the invoice, as represented by 9. The discount agent, on the last day of the term, will pay the winning bidder F the discount amount previously advanced by the winning bidder plus the money required by the bidder for accepting the risk of advancing the money as shown at 10.

Referring to FIG. 2, if no acceptable bid is received by the discount agent D, the discount agent D communicates the results to the buyer B, as represented by 11. The buyer B in turn pays the supplier A, as represented by 12, prior to the end of the payment term. In this scenario, no discount has been utilized.

The following example will help illustrate the method and system described in FIGS. 1 and 2. As an example of the process illustrated in FIG. 1, the buyer purchases $100,000 worth of goods from the supplier. The supplier provides an invoice stating that $100,000 is due within thirty (30) days, but a discount of two percent (2%) will be given if paid within ten (10) days. The buyer reviews the discount but determines that it will not pay the invoice until 30 days, and will assign the invoice to the discount agent. It is worth noting that a two percent (2%) discount for paying twenty (20) days earlier translates into approximately a thirty-eight percent (36.5%) rate of return. As fund managers, insurance institutions, etc. are continuously looking for relatively safe investments that have a high yield, these discounts can be highly marketable. The discount agent will notify appropriate bidders of the invoice and solicit bids therefore. The bidders will examine the terms and decide what rate of return they require for the transaction and bid accordingly. The bids will be returned to the discount agent for review. Each bid will indicate the rate of return required by the bidder. Generally, the bidders will require a rate of return less than the rate of return of the invoice. In this example, three bidders bid a rate of return of 30%, 24%, and 26%, respectively. The discount agent would accept the 24% rate of return (the lower the rate of return bid, the greater the difference between the rate of return of the invoice and the bid, and the greater profit for the discount agent). This entire process must occur within the 10 day discount window established by the supplier. After the discount agent has determined the winning bidder, the discount agent notifies the winning bidder and collects the $98,000 from the winning bidder on or before the $10^{th}$ day (last discount day). The discount agent is turn pays the $98,000 to the supplier before the expiration of the discount term. By so doing, the supplier's terms have been met and the supplier considers the transaction complete. At the end of the full term of the invoice, the buyer pays the discount agent $100,000 and the discount agent in turn pays the winning bidder $99,289 (98,000+0.24(98,000)(20/365)) and retains $711 for itself. At this point all obligations have been met and the transaction is closed. In order to entice buyers to use the services of a discount agent, the discount agent may share a portion of its profits with the buyer, as represented at 14.

If in the above example bidders bid 40%, 42%, and 44%, the discount agent would not accept any bids and the invoice would not be paid early. The buyer would merely pay the supplier the fall invoice price at the end of the term, as represented in FIG. 2.

Figure 4:
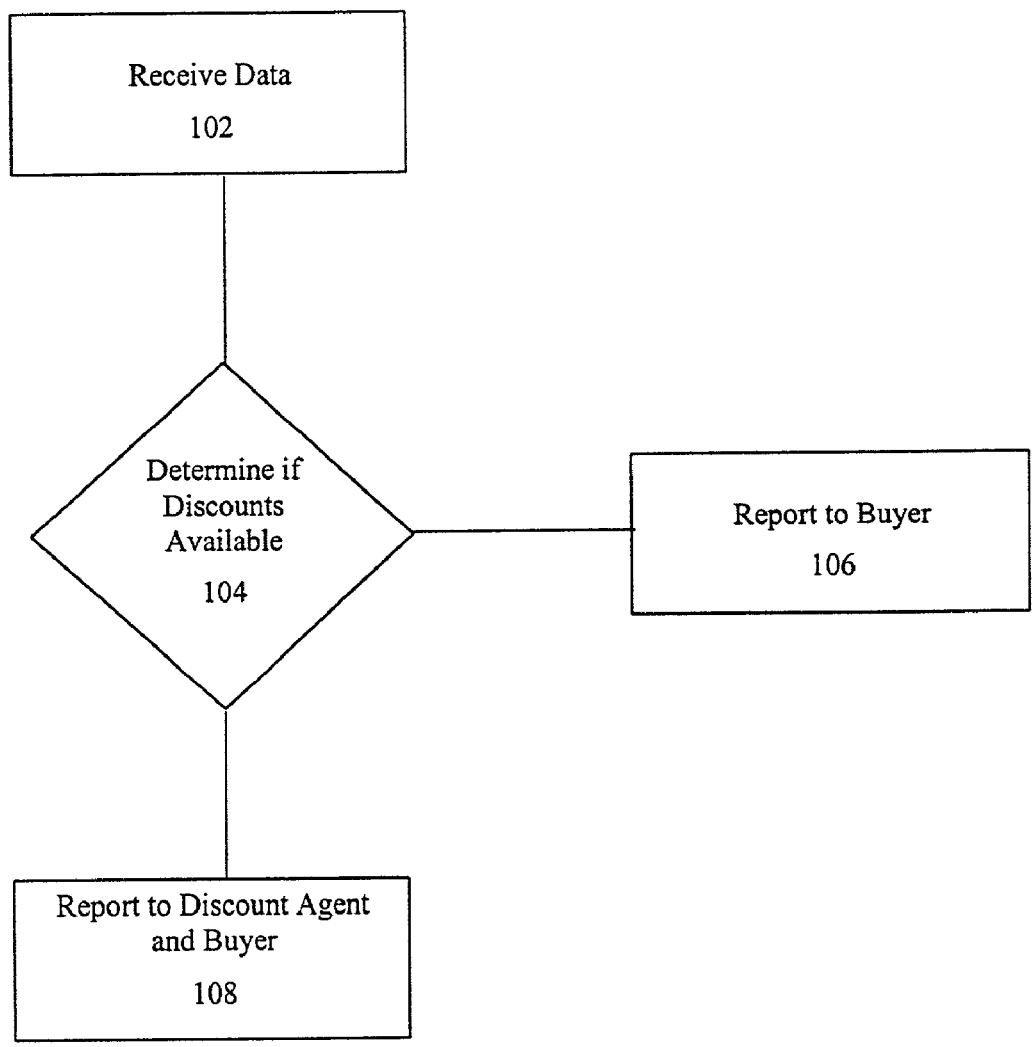
FIG. 4 illustrates the diagram representing the process performed by a sorting software to identify whether available discounts are provided in a database.

Referring to FIG. 4, the searching software receives data 102 from the buyer, the discount agent, or other party contracted to provide the data. The software searches the data 104 to determine if any discount terms are available. If no discount terms are available, the searching software reports the information 106, thereby allowing the buyer to pay the invoice prior to expiration of the payment period. If, however, discounts are available, a report indicating the available discounts is generated 108 and provided to the discount agent, as indicated in FIGS. 1 and 2, or to the buyer, as indicated in FIG. 3.

Figure 5:
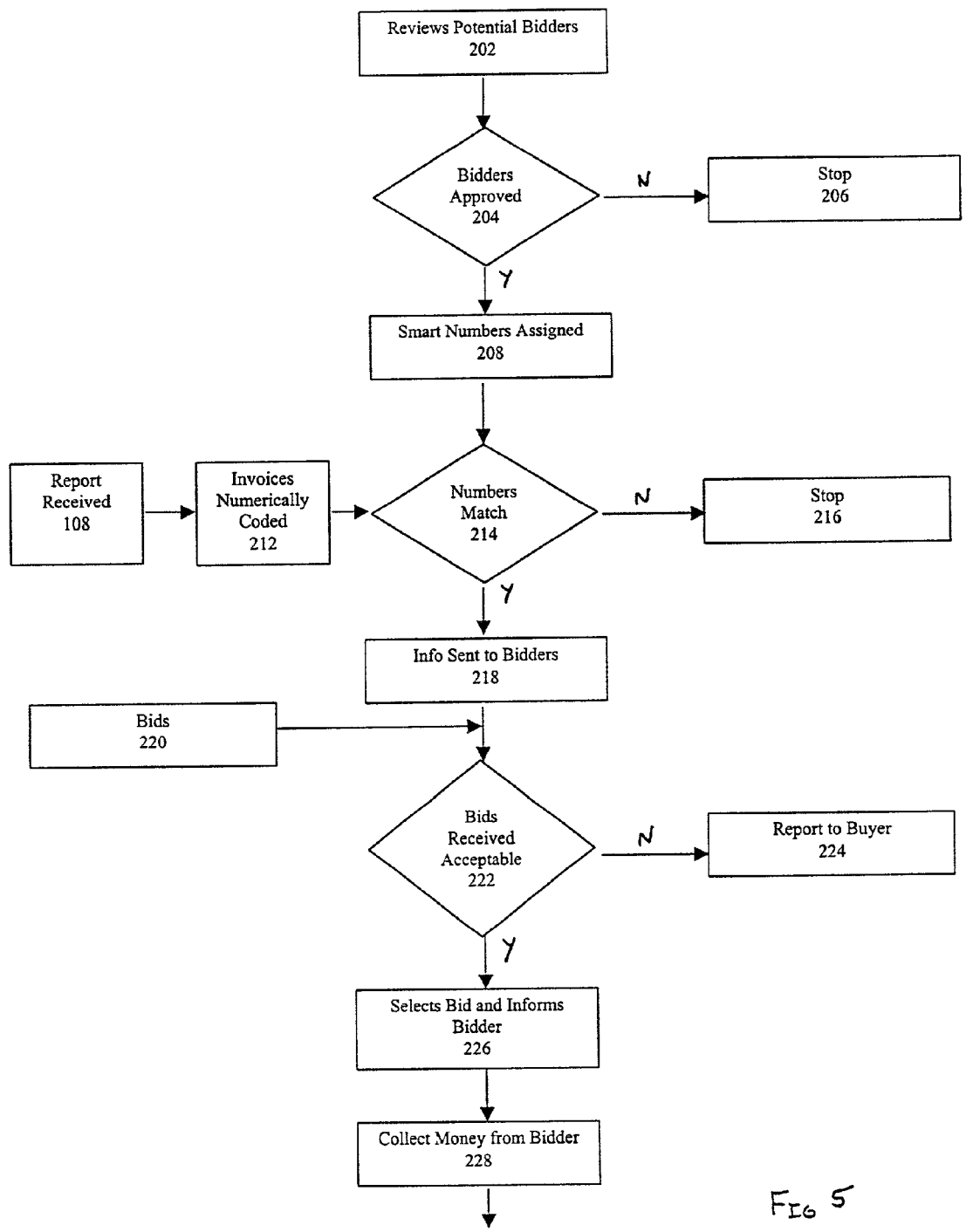
FIGS. 5 and 5a illustrate the diagram representing the process performed by a discount agent.
Figure 5A:
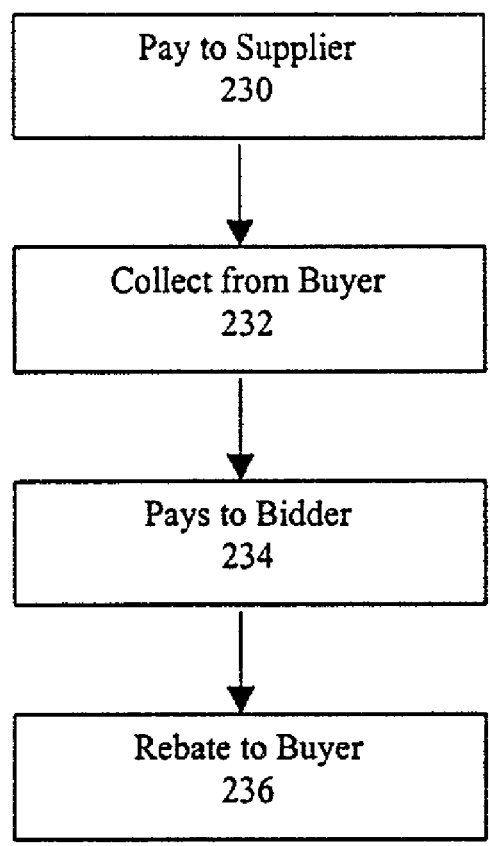

The discount agent D, as shown in FIG. 5, performs many functions. As represented by box 202, the discount agent reviews potential bidders and their preferences, and determines if the bidders are suitable 204. If the bidders are approved, a smart number is assigned to the bidder 208. A report is received 108, by the discount agent indicating invoices upon which discounts are available. The discount agent numerically codes 212 the invoices and matches various digits with the coding from the bidders 214. If no matches occur, the process is stopped 216. If matches occur, information is sent to the potential bidders 218. Bids 220 are then received back from the bidders. The discount agent reviews the bids and determines if any are acceptable 222. If no bids are acceptable, the discount agent so informs the buyer 224 and the discount agent's involvement with respect to that transaction is ended. If the discount agent determines that bids are acceptable, the discount agent chooses the most appropriate bid and so informs the bidder 226. The discount agent collects the appropriate money from the successful bidder 228 in a timely manner and pays the money to the supplier 230. After the appropriate time passes, the discount agent collects the full invoice price from the buyer 232 and pays the appropriate portion to the successful bidder 239. In some instances, the discount agent will reimburse the buyer a portion of the invoice price 236. The remaining money not paid by the discount agent is the discount agent's share. Upon completion, the particular transaction is closed. This process is repeated many times for many invoices from many buyers.

The advantages of the above-described system are numerous. The method described allows the transaction between the buyer and supplier to be conducted in the normal course of business. No changes are evident from what is traditionally done. However, the supplier gets paid faster. In addition, the buyer can pay on regular terms, but may receive a rebate from the discount agent.

While the use of the Internet is not required for this process, the speed of the process is important to take advantage of the discount terms. The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method for exploiting discount opportunities relating to invoices billed from a supplier to a buyer, the invoices having invoice terms which state a discount price if the invoice is paid within a discount period and a full price of the invoice is not paid within the discount period, the method comprising the steps of:

identifying invoices which have discount prices associated with payment of the invoice during the discount period;

providing information relating to the invoices on which discounts are available to prospective bidders;

receiving bids from respective potential bidders which indicate the bidders terms upon which the respective potential bidders will pay the invoices during the discount period;

selecting a winning bidder from the respective potential bidders, the winning bidder is selected based upon select criteria, whereby if no respective potential bidders meet the select criteria, no winning bidder will be selected.

2. The method as recited in claim 1 wherein the winning bidder pays the discount price of the invoice before the end of a discount period, and the supplier receives payment of the discount price before the end of the discount period.

3. The method as recited in claim 2 wherein the buyer pays the full price of the invoice after the discount period has expired.

4. The method as recited in claim 3 wherein the winning bidder is paid the discount price plus an agreed upon return after the buyer has paid the full price of the invoice.

5. The method as recited in claim 4 wherein the buyer receives a rebate after the full price of the invoice has been paid.

6. The method as recited in claim 1 wherein the potential bidders are prequalified and assigned a numerical code to indicate preferences on the type of invoices on which the respective potential bidder will bid.

7. The method as recited in claim 6 wherein the invoice is numerically coded according to appropriate criteria.

8. The method as recited in claim 7 wherein the numerical coding of the potential bidders and the numerical coding of the invoice is compared, whereby only invoices which meet the respective bidders preferences will be sent to that respective bidder.

9. The method as recited in claim 1 wherein a discount agent uses the internet for the bidding process.

10. A method of exploiting discount opportunities relating to invoices billed from a supplier to a buyer, the invoices having invoice terms which state a discount price if the invoice is paid within a discount period and a full price of the invoice is not paid within the discount period, the method comprising the steps of:
    numerically coding the invoices according to appropriate criteria;
    numerically coding potential bidders to indicate preferences on the type of invoices on which the respective potential bidder will bid;
    matching the numerical coding of the potential bidders and the numerical coding of the invoice;
    providing information relating to the invoices which match the numerical coding of respective prospective bidders to such respective prospective bidders;
    receiving bids from respective potential bidders which indicate the bidders terms upon which the respective potential bidders will pay the invoices during the discount period;
    selecting a winning bidder from the respective potential bidders, the winning bidder is selected based upon select criteria, whereby if no respective potential bidders meet the select criteria, no winning bidder will be selected.

11. The method as recited in claim 10 wherein the winning bidder pays the discount price of the invoice before the end of a discount period, and the supplier receives payment of the discount price before the end of the discount period.

12. The method as recited in claim 11 wherein the buyer pays the full price of the invoice after the discount period has expired.

13. The method as recited in claim 12 wherein the winning bidder is paid the discount price plus an agreed upon return after the buyer has paid the full price of the invoice.

14. The method as recited in claim 13 wherein the buyer receives a rebate after the full price of the invoice has been paid.

* * * * *